United States Patent
Miller et al.

(10) Patent No.: US 10,221,499 B2
(45) Date of Patent: Mar. 5, 2019

(54) NUCLEAR FUEL STRUCTURE AND METHOD OF MAKING A NUCLEAR FUEL STRUCTURE USING A DETACHABLE CATHODE MATERIAL

(71) Applicants: Gary L. Miller, Wilmington, NC (US); Keith H. Keller, Wilmington, NC (US)

(72) Inventors: Gary L. Miller, Wilmington, NC (US); Keith H. Keller, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 786 days.

(21) Appl. No.: 14/750,086

(22) Filed: Jun. 25, 2015

(65) Prior Publication Data
US 2016/0376723 A1 Dec. 29, 2016

(51) Int. Cl.
*C25D 17/00* (2006.01)
*C25D 17/12* (2006.01)
(Continued)

(52) U.S. Cl.
CPC ............ *C25D 17/12* (2013.01); *C25C 3/34* (2013.01); *C25C 7/005* (2013.01); *C25C 7/025* (2013.01);
(Continued)

(58) Field of Classification Search
CPC .... C25C 1/22; C25C 3/34; C25C 7/00; C25C 7/005; C25C 7/02–7/025; C25D 3/54;
(Continued)

(56) References Cited

U.S. PATENT DOCUMENTS 2,529,237 A * 11/1950 Turner .................. C25C 5/02
204/284
4,880,506 A 11/1989 Ackerman et al.
(Continued)

FOREIGN PATENT DOCUMENTS

DE 3837572 A1 5/1989
GB 2341396 A 3/2000
(Continued)

OTHER PUBLICATIONS

Dictionary.com (Blade, http://www.dictionary.com/browse/blade).*
(Continued)

*Primary Examiner* — Alexander W Keeling
(74) *Attorney, Agent, or Firm* — Harness, Dickey & Pierce, P.L.C.

(57) ABSTRACT

A method of making a nuclear fuel structure may include reducing a metal oxide in a cathode assembly so as to deposit a metal of the metal oxide on the cathode plate of the cathode assembly, and processing the cathode plate with the metal deposited thereon to fabricate the nuclear fuel structure. The cathode plate may include an upper blade including an electrically conductive material, a lower blade portion connected to the upper blade, and a connection structure configured to secure the lower blade portion to the upper blade while providing electrical continuity. The connection structure may be configured to be disconnected from the lower blade portion to detach the lower blade portion from the upper blade.

20 Claims, 10 Drawing Sheets

FIG. 2A

(51) Int. Cl.

| | |
|---|---|
| *C25C 3/34* | (2006.01) |
| *G21C 19/42* | (2006.01) |
| *G21C 19/44* | (2006.01) |
| *G21C 19/48* | (2006.01) |
| *G21F 9/30* | (2006.01) |
| *C25D 3/54* | (2006.01) |
| *G21C 21/02* | (2006.01) |
| *C25C 7/00* | (2006.01) |
| *C25C 7/02* | (2006.01) |
| *C25C 7/08* | (2006.01) |

(52) U.S. Cl.
CPC ............... *C25C 7/08* (2013.01); *C25D 3/54* (2013.01); *G21C 19/42* (2013.01); *G21C 19/44* (2013.01); *G21C 19/48* (2013.01); *G21C 21/02* (2013.01); *G21F 9/30* (2013.01); *Y02W 30/882* (2015.05); *Y02W 30/884* (2015.05)

(58) Field of Classification Search
CPC .......... C25D 3/66; C25D 17/00; C25D 17/10; C25D 17/12; G21C 19/44; G21C 19/48
See application file for complete search history.

(56) References Cited

U.S. PATENT DOCUMENTS

| | | | | |
|---|---|---|---|---|
| 4,995,948 | A | * | 2/1991 | Poa ..................... C25C 7/005 204/241 |
| 8,900,439 | B2 | | 12/2014 | Wiedmeyer et al. |
| 2012/0048745 | A1 | * | 3/2012 | Dickson ................. B01D 17/06 205/704 |
| 2012/0160700 | A1 | * | 6/2012 | Wiedmeyer ............... C25C 3/34 205/477 |
| 2016/0201205 | A1 | * | 7/2016 | Sugamoto ................. B22C 9/06 204/288.4 |

FOREIGN PATENT DOCUMENTS

| | | |
|---|---|---|
| WO | 02090622 A2 | 11/2002 |
| WO | 2008101283 A1 | 8/2008 |
| WO | 2012087399 A1 | 6/2012 |
| WO | 2012087400 A1 | 6/2012 |
| WO | 02099815 A2 | 12/2012 |
| WO | WO-2015022846 A1 * | 2/2015 ............... B22C 9/06 |

OTHER PUBLICATIONS

PCT Invitation to Pay Additional Fees issued in connection with corresponding Application No. PCT/US2016/035376 on Sep. 12, 2016.

International Search Report and Written Opinion issued in connection with corresponding PCT Application No. PCT/US2016/035376 dated Nov. 23, 2016.

* cited by examiner

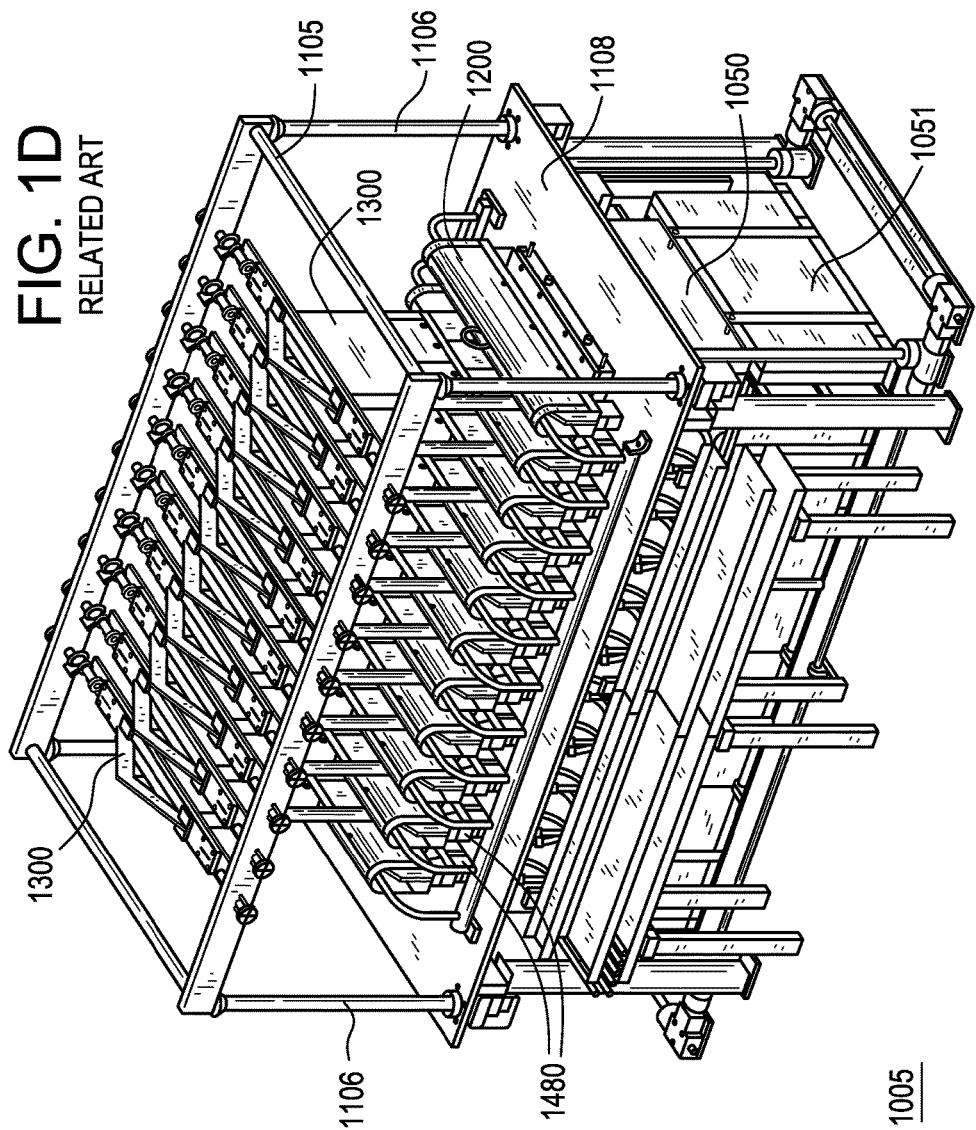

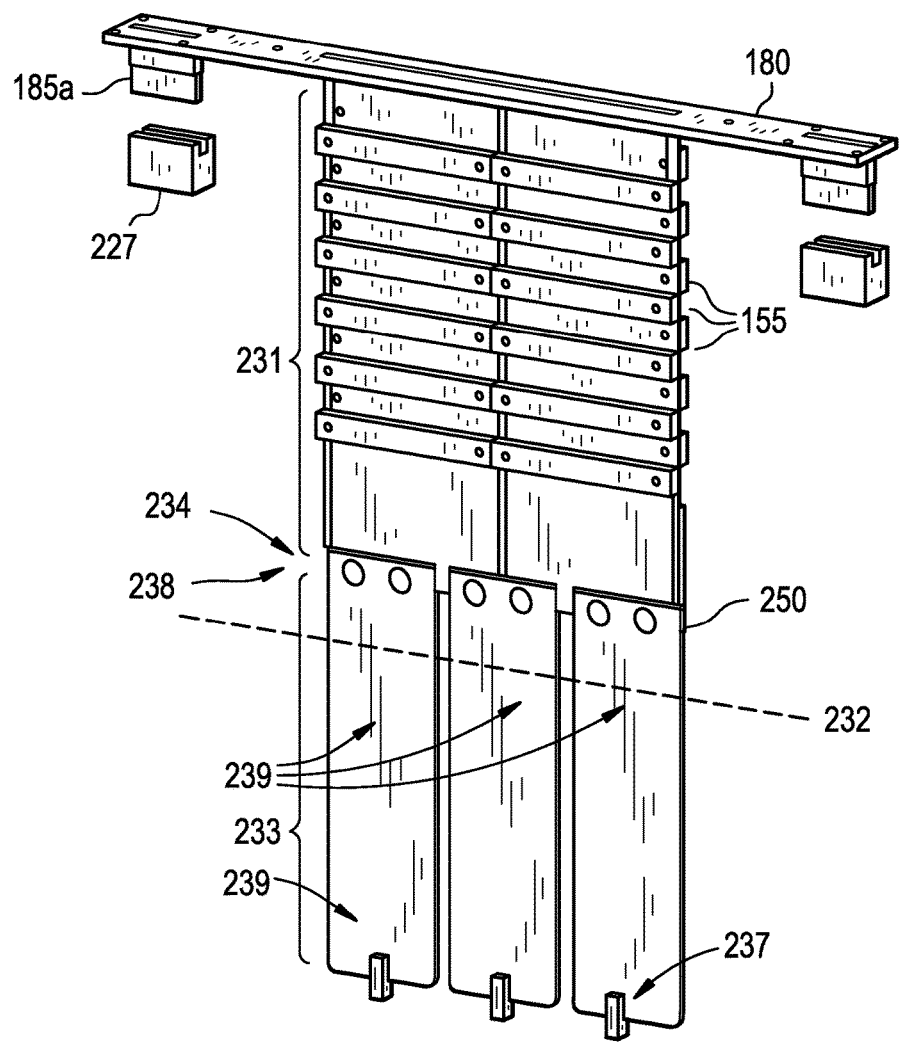

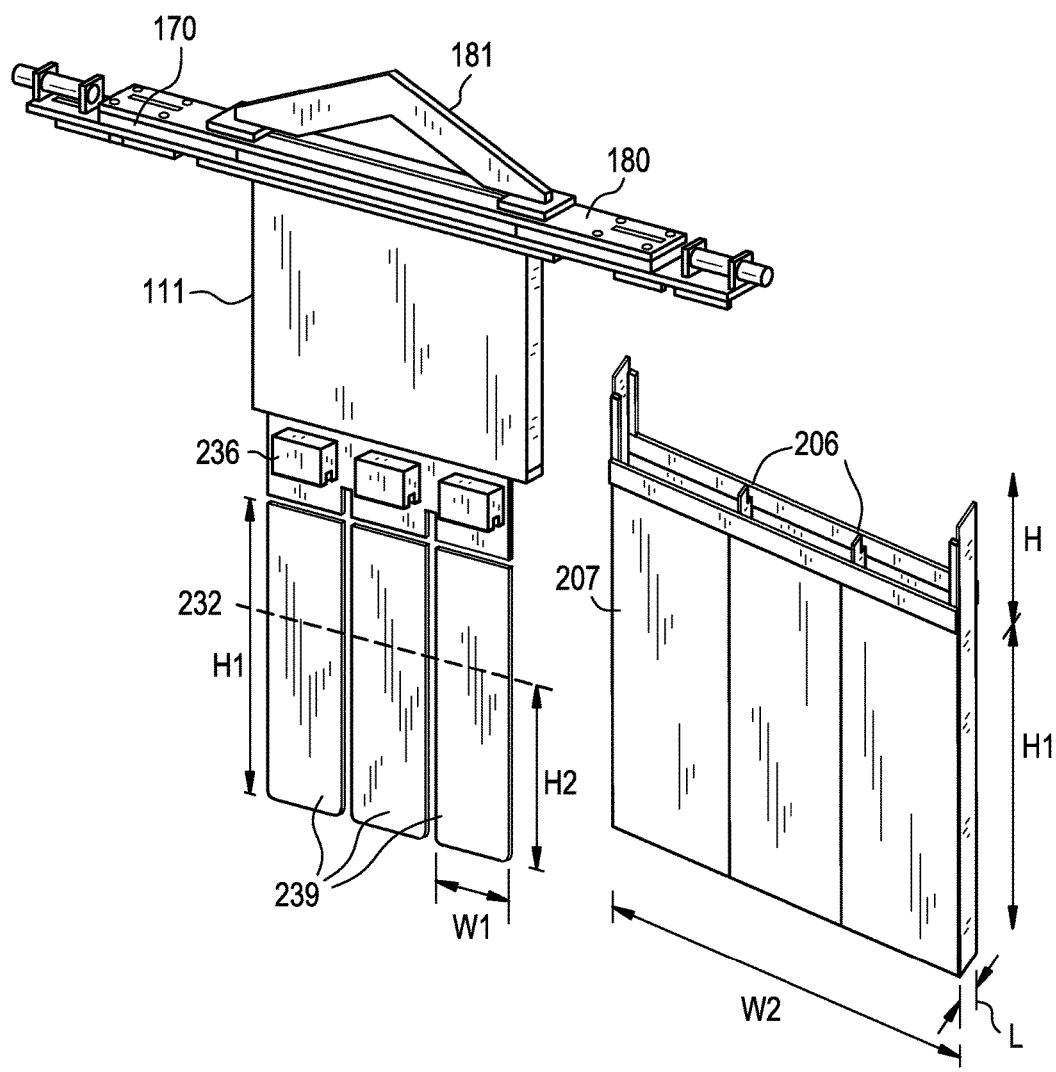

NUCLEAR FUEL STRUCTURE AND METHOD OF MAKING A NUCLEAR FUEL STRUCTURE USING A DETACHABLE CATHODE MATERIAL

BACKGROUND

Field

The present disclosure relates to a cathode plate, a cathode basket assembly, and/or methods of manufacturing a cathode plate and/or a cathode basket assembly. More particularly, the present disclosure relates to a cathode plate including a blade fabricated from a material used in subsequent processing, a cathode basket assembly including the cathode plate, and/or methods of manufacturing the cathode plate and/or cathode basket assembly.

Description of Related Art

Electrochemical processes, such as electrolytic oxide reduction, may be used to reduce metal-oxides to their corresponding metallic (unoxidized) state. Such processes may be used to recover high purity metal(s) from an impure feed, and/or extract metal(s) from metal-oxide ores. For example, in a process similar to electroplating, an electrolytic oxide reduction process may be carried out within a cathode basket assembly to convert metal oxide (e.g., uranium oxide and/or plutonium oxide) into metal (e.g., uranium and/or plutonium). The process generally includes immersing a metal oxide in a molten electrolyte compatible with the metal oxide, together with a cathode and anode, the metal oxide contained within the cathode basket assembly such that the cathode electrically contacts the metal oxide. By charging the anode and cathode (and the metal oxide via the cathode), the metal oxide may be reduced through electrolytic conversion and ion exchange through the molten electrolyte. As a result, metal (i.e., reduced metal oxide) may be electrolytically deposited on a portion of the cathode using an electrochemical process. Additionally, in the case of extracting uranium and/or plutonium from uranium oxide and/or plutonium oxide using an electrochemical process, the converted metal may be subsequently processed for use as fuel in a reactor.

In a conventional electrolytic oxide reduction process, the electrolytically-deposited metal may be recovered by physically removing (e.g., scraping, grinding, or chiseling) the metal from the portion of the cathode where the metal is deposited.

SUMMARY

Some example embodiments relate to a method of making a nuclear fuel structure.

Some example embodiments relate to a cathode plate and/or a cathode basket assembly including the same.

Other example embodiments relate to a method of making a cathode plate and/or a cathode basket assembly including the same.

Some example embodiments relate to a method of making a structure using a detachable cathode material method.

According to an example embodiment, a method of making a nuclear fuel structure may include reducing a metal oxide in a cathode assembly so as to deposit a metal of the metal oxide on a cathode plate of the cathode assembly, and processing the cathode plate with the metal deposited thereon to fabricate the nuclear fuel structure.

The reducing may include at least one of immersing the cathode assembly with the metal oxide in an electrolyte, and energizing the cathode assembly.

The metal oxide may include at least one of spent nuclear fuel, plutonium oxide, and uranium oxide.

The processing may include removing the cathode plate with the metal deposited thereon from the cathode assembly. The nuclear fuel structure may be a fuel rod.

The cathode plate may include an upper blade and a lower blade portion. The removing may include detaching the lower blade portion from the upper plate portion.

According to an example embodiment, a cathode plate may include an upper blade including an electrically conductive material, a lower blade portion connected to the upper blade, and a connection structure configured to secure the lower blade portion to the upper blade while providing electrical continuity. The connection structure may be configured to be disconnected from the lower blade portion to detach the lower blade portion from the upper blade.

A material of the lower blade portion may be different than the electrically conductive material of the upper blade.

The lower blade portion may include uranium, zirconium, or a combination thereof.

The lower blade portion may be in a form of a plurality of lower blades spaced apart from each other. The connection structure may include a plurality of connection structure portions. The plurality of connection structure portions may each be configured to secure a corresponding one of the plurality of lower blades to the upper blade.

Each of the plurality of connection structure portions may be one of a multi-layer structure including a ceramic outer portion and an electrically conductive portion contacting upper blade and the corresponding one of the plurality of lower blades, a nut and bolt, and a knife contact.

One or more of the plurality of lower blades may include at least one of: a thickness that is greater than 0 inches and less than a thickness of the upper blade, to portions having different widths relative to each other, and at least one opening defined by the one or more of the plurality of lower blades.

The cathode plate may further include one or more ceramic spacers spaced apart from each other all on at least one of the front surface and the back surface of the upper blade. The back surface may be opposite the front service.

In an example embodiment, a cathode basket assembly may include an upper basket assembly, the lower basket assembly joined to the upper basket assembly, and the cathode plate described above suspended in the cathode basket assembly. The upper basket assembly may surround the upper blade. The one or more ceramic spacers may electrically insulate the upper blade from upper basket assembly. The lower blade portion may be partially enclosed by the lower basket assembly without directly contacting the lower basket assembly. The lower basket assembly may be configured to detach from the upper basket assembly to remove the cathode plate from a cathode basket assembly.

The lower blade portion of the cathode plate may be in the form of a plurality of lower blades spaced apart from each other. The lower basket assembly may include the dividers that divide the basket compartments. The plurality of lower blades may be in corresponding ones of the basket compartments without directly contacting the lower basket assembly.

The cathode basket assembly may further include at least one bottom ceramic structure between a base of the lower blade portion and a bottom of the lower basket assembly. The at least one bottom ceramic structure may be configured to maintain a physical separation between the lower blade portion and the lower basket assembly.

The lower blade portion may include uranium, zirconium, or a combination thereof. The cathode basket assembly may be configured to deposit a metal onto the lower blade portion if a mixture containing an electrolyte in the metal oxide is in the lower basket assembly and contacting the lower blade portion, the cathode basket assembly energizes the mixture in order to reduce the metal oxide into the metal and deposit the metal on the lower blade portion, and the metal oxide includes at least one of plutonium oxide and uranium oxide.

According to an example embodiment, a method of manufacturing a cathode plate may include securing an upper blade to a lower blade portion with a connection structure. The upper blade may include an electrically conductive material. The connection structure may be configured to provide electrical continuity between the lower blade portion and the upper blade when the connection structure secures the lower blade portion to the upper blade. The connection structure may be configured to be disconnected from the lower blade portion to detach the lower blade portion from the upper blade.

A material of the lower blade portion may be different than the electrically conductive material of upper blade. The lower blade portion may include uranium, zirconium, or a combination thereof.

The lower blade portion may be a plurality of lower blades spaced apart from each other. The connection structure may include a plurality of connection structure portions. The securing the upper blade to the lower blade portion may include securing the upper blade to the plurality of lower blades using the plurality of connection structure portions.

Each of the plurality of connection structure portions may be one of a ceramic spacer with underlying metal and the knife contact.

According to an example embodiment, a method of manufacturing a cathode basket assembly may include manufacturing a cathode plate using the method described above, joining a lower basket assembly to an upper basket assembly to form a joint assembly, suspending the cathode plate in the joint assembly. Upper basket assembly may surround the upper blade the lower blade portion may be partially enclosed by the lower basket assembly. The upper blade in the lower blade portion may be electrically insulated from upper basket assembly in the lower basket assembly, and the upper blade in the lower blade portion may be electrically insulated from upper basket assembly and the lower basket assembly, respectively. The lower basket assembly may be configured to detach from the upper basket assembly to remove the cathode plate from the joint assembly.

According to an example embodiment, a method of making a structure may include depositing a metal on at least one lower blade of a cathode plate suspended in the cathode basket assembly by energizing a mixture contacting the at least one lower blade in the cathode basket assembly in order to reduce the metal oxide into the metal, and separating the at least one lower blade from the cathode plate. The mixture may include an electrolyte and a metal oxide. The cathode plate may include an upper blade secured to the at least one lower blade with the connection structure configured to provide electrical continuity between the at least one lower blade in upper blade when the connection structure secures that at least one lower blade to the upper plate. The connection structure may be configured to be disconnected from at least one lower blade. The cathode basket assembly may include a lower basket assembly joined to an upper basket assembly. The upper basket assembly may surround the upper blade without directly contacting upper blade in the lower basket assembly enclosing a bottom portion of the at least one lower blade without directly contacting the at least one lower blade when the cathode place suspended in the cathode basket assembly the lower basket assembly of the cathode basket assembly may be filled with the mixture.

The method may further include processing the at least one lower blade into a fuel rod after the depositing the metal and the separating the at least one lower blade from a cathode plate. The at least one lower blade may include uranium, zirconium, or a combination thereof. The metal oxide may include at least one of plutonium oxide and uranium oxide. The connection structure may be configured to maintain a physical separation between the at least one lower blade and upper blade.

The upper blade may be stainless steel.

The at least one blade may be a plurality of lower blades spaced apart from each other. The lower basket assembly may include dividers that defined basket compartments. The suspending the cathode plate in the basket assembly may include arranging the plurality of lower blades in corresponding ones of the basket compartments so the plurality of lower blades to not directly contact the lower basket assembly.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

FIG. 1D illustrates another example of an electrolytic oxide reduction system (EORS);

FIGS. 2A to 2C illustrate cathode plates according to some example embodiments;

FIG. 4 illustrates a cathode basket assembly according to an example embodiment.

DETAILED DESCRIPTION

Figure 1A:
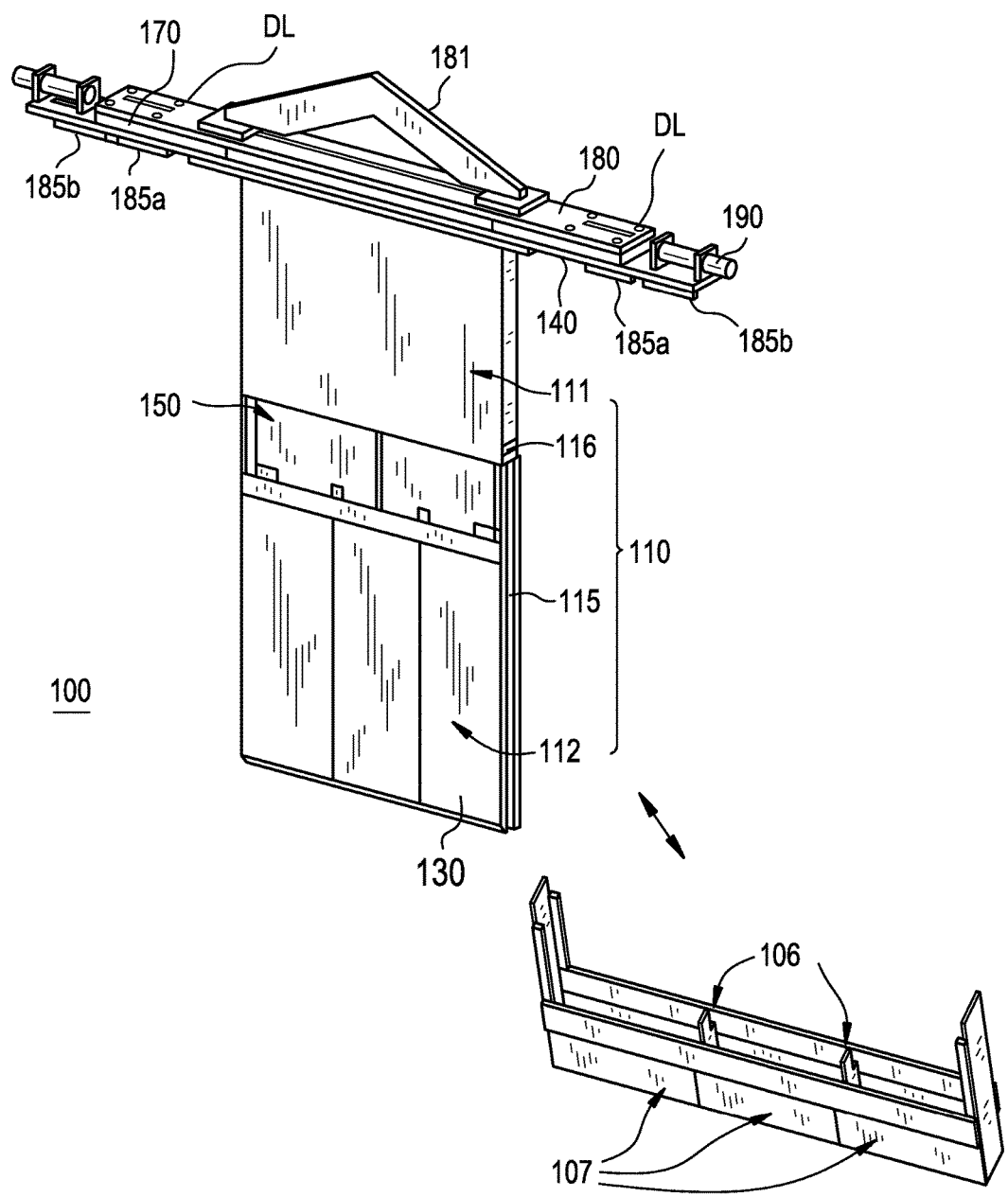
FIG. 1A illustrates a conventional cathode basket assembly.

Example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments to those of ordinary skill in the art. In the drawings, like reference numerals in the drawings denote like elements, and thus their description may be omitted.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Figure 1B:
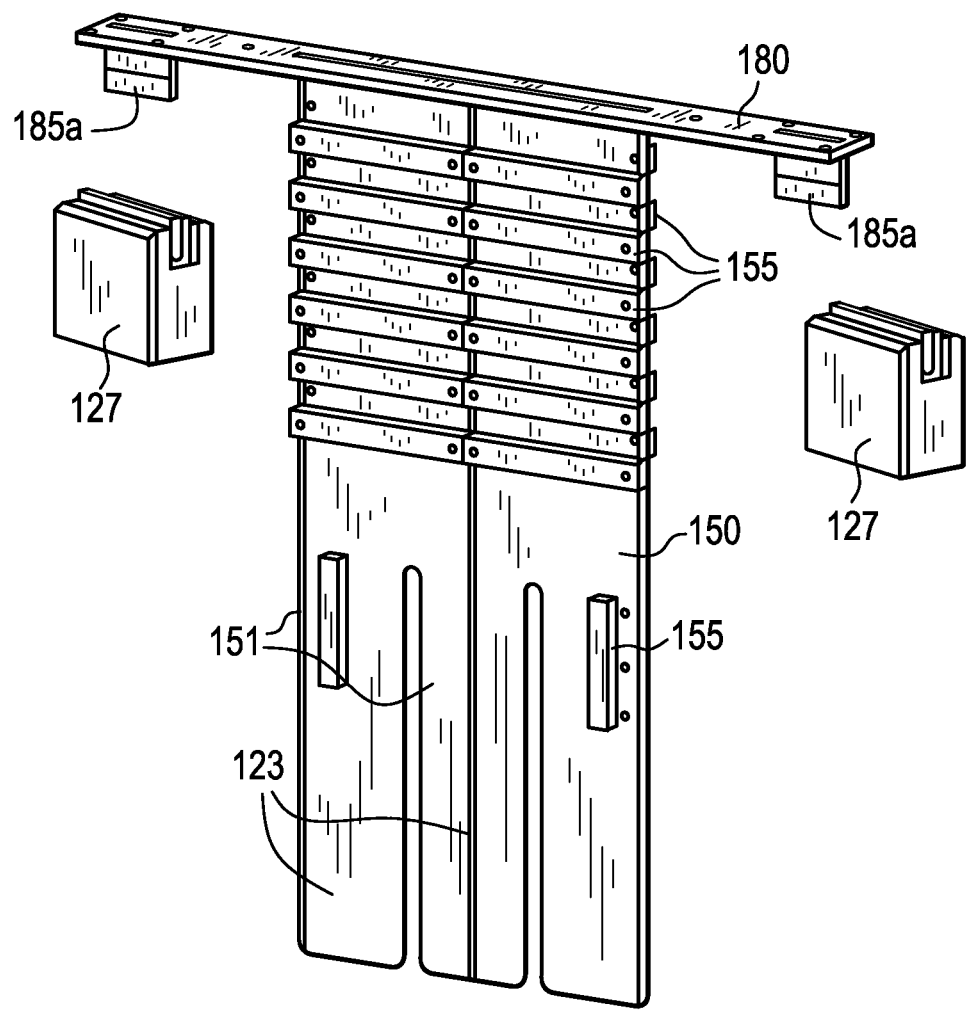
FIG. 1B illustrates a cathode plate useable in a conventional cathode basket assembly.
Figure 1C:
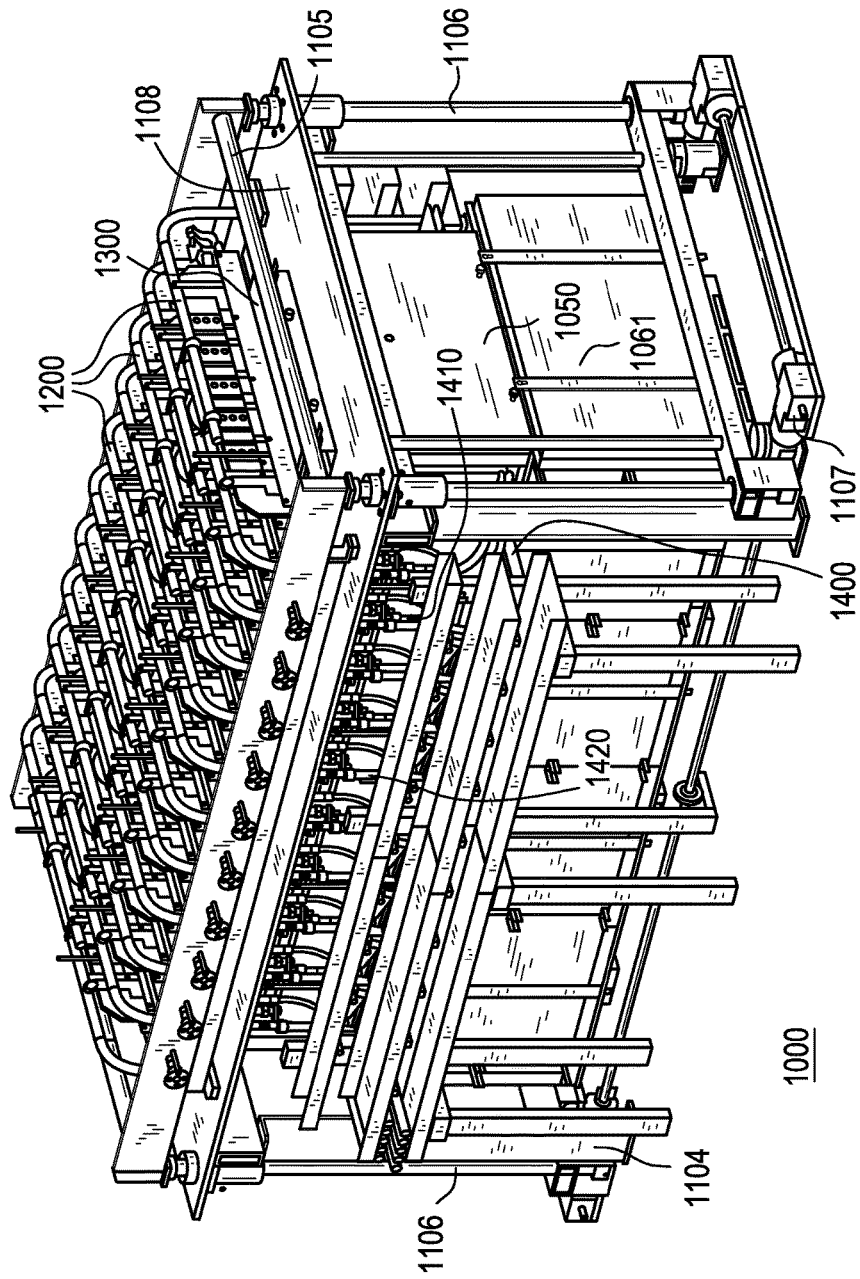
FIG. 1C illustrates an example of an electrolytic oxide reduction system (EORS)

FIG. 1A illustrates a conventional cathode basket assembly. FIG. 1B illustrates a cathode plate useable in a conventional cathode basket assembly. FIG. 1C illustrates an example of an electrolytic oxide reduction system (EORS). FIG. 1D illustrates another example of an electrolytic oxide reduction system (EORS). Although aspects of a conventional electrolytic oxide reduction process and EORS are described hereinafter with reference to FIGS. 1A, 1B, 1C, and 1D, a more detailed description is provided in U.S. Pat. No. 8,800,439, the entire contents of which is hereby incorporated by reference in its entirety.

Referring to FIG. 1A, a conventional cathode basket assembly 100 may include an upper portion 111 (or upper basket assembly) and a lower portion 112 (or lower basket assembly), and these portions may have differing structures to accommodate use in electrolytic oxide reduction systems (EORS) 1000 and 1005, which are described later with reference to FIGS. 1C and 1D.

The upper portion 111 may be hollow and enclosed, or any other desired shape and length to permit use in reduction systems. The lower portion 112 may form a basket or other enclosure 110 into which oxides and/or other materials for electrolytic reduction may be placed. The lower portion 112 may include dividers 106 that divide the lower portion 112 into a plurality of sections (e.g., basket compartments 107) for separating and/or distributing material to be reduced in the lower portion 112.

The lower portion 112 and upper portion 111 may be sufficiently divided to define a gap or other opening through which material may be placed into the lower portion 112. As shown in FIG. 1A, the upper portion 111 and lower portion 112 may be joined at a rivet point 116 along shared sheet metal side 115 so as to define a gap or opening for oxide entry along a planar face of the cathode basket assembly 100. The upper portion 111 and the lower portion 112 may be flexibly mechanically connected through a rivet point 116 or any other suitable connection. The opening between the upper basket assembly 111 (or upper portion) and the lower basket assembly 112 (or lower portion) exposes a cathode plate 150 that may be positioned inside the cathode basket assembly 100. The cathode plate 150 is described in more detail with reference to FIG. 1B. The opening that exposes the cathode plate 150 on the front side may also be defined on the backside of the cathode basket assembly 100 to expose the backside of the cathode plate 150.

The lower portion 112 may be structured to interact with and/or enter into contact with an electrolyte. For example, the lower portion 112 may include oxide fill ports 130, which are shown below the exposed portion of the cathode plate 150. The oxide fill ports 130 may be a portion of the cathode basket assembly 100 that includes permeable material placed along planar faces of lower portion 112. The permeable material of the oxide fill ports 130 permits electrolyte to pass into lower portion 112 while retaining a material to be reduced (e.g., plutonium oxide or uranium oxide) so that the material does not physically disperse into the electrolyte or outside basket 110. The permeable material of the oxide fill ports 130 may include any number of materials that are resilient to, and allow passage of, ionized electrolyte therethrough, including inert membranes and finely porous metallic plates (e.g., porous stainless steel plates), for example. The permeable material of the oxide fill ports 130 in the lower portion 112 may be joined to a sheet metal edge 115 and bottom to form an enclosure that does not permit oxide or reduced metal to escape from the lower portion 112. In this way, lower portion 112 may provide space for holding material for reduction (e.g., several kilograms of material for reduction), permitting reduction on a flexible and commercial scale, while reducing areas where molten electrolyte may solidify or clog. Although the basket 110 is shown with a planar shape to provide a large surface area for the permeable material of the oxide fill ports 130 and electrolyte interaction therethrough, the basket 110 may be shaped, positioned, and sized in any manner based on desired functionality and contents.

The lower portion 112 may be vertically displaced from upper portion 111 to ensure the upper portion 111 resides above an electrolyte level when the lower portion 112 is immersed into an electrolyte. The upper portion 111 may join to an assembly support 140, such so the upper portion 111 and lower portion 112 of basket 110 can extend from and receive support from assembly support 140. The assembly support 140 may support the cathode basket assembly 100 above an electrolyte. For example, the assembly support 140 may extend to overlap the top plate 1108 in the Electrolytic Oxide Reduction System (EORS) 1000 or 1005 described later with reference to FIGS. 1C and 1D so as to support the cathode basket assembly extending into electrolyte container 1050 from above. Although lower portion 112 may extend into ionized, high-temperature electrolyte, the separation from upper portion 111 may reduce heat and/or caustic material transfer to upper portion 111 and the remaining portions of cathode basket assembly 100, reducing damage and wear.

As shown in FIGS. 1A and 1B, the conventional cathode basket assembly 100 further includes the cathode plate 150. The cathode plate 150 may extend through and/or be supported by assembly support 140 and extend into basket 110. The cathode plate 150 may extend a substantial distance into basket 110, into lower section 112 so as to be submerged in electrolyte with lower section 112 and directly contact oxide material to be reduced that is held in lower section 112. As shown in FIG. 1B, cathode plate 150 may include a shape or structure to compatibly fit or match with basket 110. Although FIGS. 1A and 1B illustrate an example where the basket 110 includes three basket compartments 107 and the cathode plate 150 includes three lower blade portions 123 sized to compatibly fit in the three basket compartments 107, the number of corresponding basket compartments 107 and lower blade portions 123 are not particularly limiting and may be varied.

During a conventional electrolytic oxide reduction process, the cathode plate 150 is electrically insulated from the basket 110, except for indirect current flow from/into cathode plate 150 into/from an electrolyte or oxide material in basket 110 which the cathode plate 150 may contact. Such insulation may be achieved in several ways, including physically separating cathode plate 150 from basket 110. As shown in FIG. 1A, cathode plate 150 may extend into a central portion of basket 110 without directly touching basket 110. The cathode plate 150 may be disconnected from the top of the cathode basket assembly 100 as the disconnection locations DL.

As shown in FIG. 1B, one or more ceramic spacers 155 (e.g., insulating pads or bands) may be placed on cathode plate 150 for proper alignment within basket 110 while still electrically insulating cathode plate 150 from the basket 110. If ceramic spacers 155 seat against an inner surface of upper portion 111 and/or are fabricated from a material that is also a thermal insulator, such as a ceramic material, ceramic spacers 155 may additionally impede heat transfer up cathode plate 150 or into upper portion 111 of basket 110. Further, where a support 180 of cathode plate 150 rests on assembly support 140, an insulating pad or buffer 170 (see FIG. 1A) may be interposed between the support 180 of cathode plate 150 and the assembly support 140 to electrically insulate the two structures from one another.

The basket 110, including upper portion 111, sheet metal edge 115, and lower portion 112 dividers and bottom, and cathode plate 150 may be fabricated from an electrically conductive material that is resilient against corrosive or thermal damage that may be caused by the operating electrolyte and will not substantially react with the material being reduced. For example, stainless steel or another non-reactive metallic alloy or material, including tungsten, molybdenum, tantalum, etc., may be used for the basket 110 and the cathode plate 150. Other components of the cathode basket assembly 100 may be equally conductive, with the exception of insulator 170, ceramic spacers 155, and handling structures.

Materials in the cathode plate 150 and the basket 110 may further be fabricated and shaped to increase strength and rigidity. For example, stiffening hems or ribs 151 may be formed in the cathode plate 150 or in the sheet metal edge 115 to decrease the risk of bowing or other distortion and/or misalignment between cathode plate 150 and basket 110. As shown in FIG. 1A, a lift handle 181 may be connected to the support 180 to permit removal, movement, or other handling of cathode plate 150 individually. For example, the cathode plate 150 may be removed from cathode assembly 100 by a user through handle 181, leaving only the basket 110. This may be advantageous in selectively cleaning, repairing, or replacing cathode plate 150 and/or harvesting or inserting material into/from the basket 110. The lift handle 181 is electrically insulated from the cathode plate 150 and the support 180, so as to limit and/or prevent user electrocution and other unwanted current flow through example electrolytic reducing systems.

The cathode assembly support 140 may further include a lift basket post 190 for removing/inserting or otherwise handling or moving cathode assembly 100, including the basket 110 and potentially the cathode plate 150. The lift basket posts 190 may be placed at either end of the cathode assembly support 140 and/or be insulated from the remainder of the cathode basket assembly 100. When used in a larger reduction system, such as EORS 1000 and/or 1005 (see FIGS. 1C and 1D), individual cathode basket assemblies 100, and all subcomponents thereof including basket 110 and cathode plate 150, may be moved and handled, automatically or manually, at various positions through the lift basket post 190.

As shown in FIG. 1A, the cathode basket assembly 100 may include one or more cathode assembly connectors 185a and 185b where cathode basket assembly 100 may mechanically and electrically connect to receive electrical power. The cathode assembly connectors 185a and 185b may be a variety of shapes and sizes, including standard plugs and/or cables, or, in example cathode basket assembly 100, knife-edge contacts that are shaped to seat into receiving fork-type connectors 127 from example power distribution systems. Although FIGS. 1A and 1B illustrate an example where two pairs of cathode assembly connectors 185a and 185b are placed on both sides of the cathode basket assembly 100, to provide even power to the assembly, the number of cathode assembly connectors 185a and 185b is not particularly limiting and may be adjusted if necessary. Additionally, in some examples, the cathode basket assembly 100 may only include the cathode assembly connectors 185a and 185b on one side of the cathode basket assembly 100.

The cathode assembly connectors 185a and 185b may electrically connect to, and provide appropriate reducing potential to, various components within the cathode basket assembly 100. For example, two separate pairs of cathode assembly connectors, 185a and 185b, may connect to different power sources and provide different electrical power, current, voltage, polarity, etc. to different parts of assembly 100. As shown in FIG. 1B, inner connectors 185a may connect to cathode plate 150 through support 180. Inner connectors 185a may extend through insulator 170 and assembly support 140 without electrical contact so as to insulate cathode plate 150 from each other component. Outer connectors 185b may connect directly to assembly support 140 and basket 110. In this way, different electrical currents, voltages, polarities, etc. may be provided to cathode plate 150 and basket 110 without electrical shorting between the two. When the cathode plate 150 is assembled in the cathode basket assembly 100, the connectors 185a and 185b may be inserted into a knife contact 127.

Referring to FIG. 1C, an Electrolytic Oxide Reduction System (EORS) 1000 includes an electrolyte container 1050 in contact with or otherwise heated by a heater 1051. The heater 1051 may be used to melt and/or dissolve an electrolyte in the container 1050. The electrolyte container 1050 may be filled with an appropriate electrolyte, such as a halide salt or salt containing a soluble oxide that provides mobile oxide ions, chosen based on the type of material to be reduced. Non-limiting examples of the electrolyte include a Ca-based electrolyte (e.g., $CaCl_2$ and CaO, or $CaF_2$ and CaO, or some other Ca-based electrolyte), or a lithium-based electrolyte mixture (e.g., LiCl and $Li_2O$). The electrolyte may be used in reducing rare-earth oxides, or actinide oxides such as uranium or plutonium oxides, or complex oxides such as spent nuclear fuel.

The EORS 1000 may include several supporting and structural members to contain, frame, and otherwise support and structure other components. For example, one or more lateral supports 1104 may extend up to and support a top plate 1108, which may include an opening (not shown) above the electrolyte container 1050 so as to permit access to the same. The top plate 1108 may be further supported and/or isolated by a glove box (not shown) connecting to and around top plate 1108. Several standardized electrical contacts 1480 (see FIG. 1D) and cooling sources/gas exhausts may be provided on or near top plate 1108 to permit anode and cathode components to be supported by and operable through EORS 1000 at modular positions. The knife contact 127 described in FIG. 1B may be connected to one of the electrical contacts 1480 so current may be through the knife contact 127 into one of the connectors 185a and 185b that is connected to the knife contract 127. The current passed through the knife contact 127 may be passed through the cathode plate 150. A lift basket system, including a lift bar 1105 and/or guide rods 1106 may connect to and/or suspend cathode assemblies 1300 that extend down into the molten electrolyte in electrolyte container 1050. Such a lift basket system may permit selective lifting or other manipulation of cathode assemblies 1300 without moving the remainder of EORS 1000 and related components. The EORS may include a gear box 1107 that works in conjunction with guide rods and lift bar to evenly lift baskets (cathode basket assemblies) out of Knife contact 185a from 227. The gear box 107 may be driven from a motor (not shown).

In FIG. 1C, the EORS includes several cathode assemblies 1300 alternating with several anode assemblies 1200 supported by various support elements and extending into electrolyte container 1050. The assemblies may further be powered or cooled through standardized connections to corresponding sources in EORS 1000. Although ten cathode assemblies 1300 and eleven anode assemblies 1200 are shown in FIG. 1C, any number of anode assemblies 1200 and cathode assemblies 1300 may be used in the EORS 1000, depending on energy resources, amount of material to be reduced, desired amount of metal to be produced, etc.

FIG. 1D is an illustration of EORS 1005 in an alternate configuration, with basket lifting system including lift bar 1105 and guide rods 1106 raised so as to selectively lift only cathode basket assemblies 1300 out of electrolyte container 1050 for access, permitting loading or unloading of reactant metals oxides or produced reduced metals from cathode assemblies 1300. In the configuration of FIG. 1D, several modular electrical contacts 1480 are shown aligned at modular positions about the opening in top plate 1108. For example, electrical contacts 1480 may be knife-edge contacts that permit several different alignments and positions of cathode basket assemblies 1300 and/or anode assemblies 1200 within EORS 1000.

As shown in FIG. 1C, a power delivery system including a bus bar 1400, anode power cable 1410, and/or cathode power cable 1420 may provide independent electric charge to anode assemblies 1200 and/or cathode assemblies 1300, through electrical contacts (not shown). During operation, electrolyte in electrolyte container 1050 may be liquefied by heating and/or dissolving or otherwise providing a liquid electrolyte material compatible with the oxide to be reduced. Operational temperatures of the liquefied electrolyte material may range from approximately 400-1200° C., based on the materials used. Oxide material, including, for example, $Nd_2O_3$, $PuO_2$, $UO_2$, complex oxides such as spent oxide nuclear fuel or rare earth ores, etc., may be loaded into cathode assemblies 1300, which extend into the liquid electrolyte, such that the oxide material is in contact with the electrolyte and cathode assembly 1300.

The cathode assembly 1300 and anode assembly 1200 may be connected to power sources so as to provide opposite charges or polarities, and a current-controlled electrochemical process occurs such that a desired electrochemically-generated reducing potential is established at the cathode by reductant electrons flowing into the metal oxide at the cathode. Because of the generated reducing potential, oxygen in the oxide material within the cathode assemblies 1300 is released and dissolves into the liquid electrolyte as an oxide ion. The reduced metal in the oxide material remains in the cathode assembly 1300. The electrolytic reaction at the cathode assemblies may be represented by equation (1):

$$\text{(Metal Oxide)} + 2e^- \rightarrow \text{(reduced Metal)} + O^{2-} \quad (1)$$

where the $2e^-$ is the current supplied by the cathode assembly 1300.

At the anode assembly 1200, negative oxygen ions dissolved in the electrolyte may transfer their negative charge to the anode assembly 1200 and convert to oxygen gas. The electrolysis reaction at the anode assemblies may be represented by equation (2):

$$2O^{2-} \rightarrow O_2 + 4e^- \quad (2)$$

where the $4\ e^-$ is the current passing into the anode assembly 1200.

If, for example, a molten Li-based salt is used as the electrolyte, cathode reactions above may be restated by equation (3):

$$\text{(Metal Oxide)} + 2e^- + 2Li^+ \rightarrow \text{(Metal Oxide)}^{+2} + 2Li \rightarrow \text{(reduced Metal)} + 2Li^+ + O^{2-} \quad (3)$$

However, this specific reaction sequence may not occur, and intermediate electrode reactions are possible, such as if cathode assembly 1300 is maintained at a less negative potential than the one at which lithium deposition will occur.

Figure 2A:
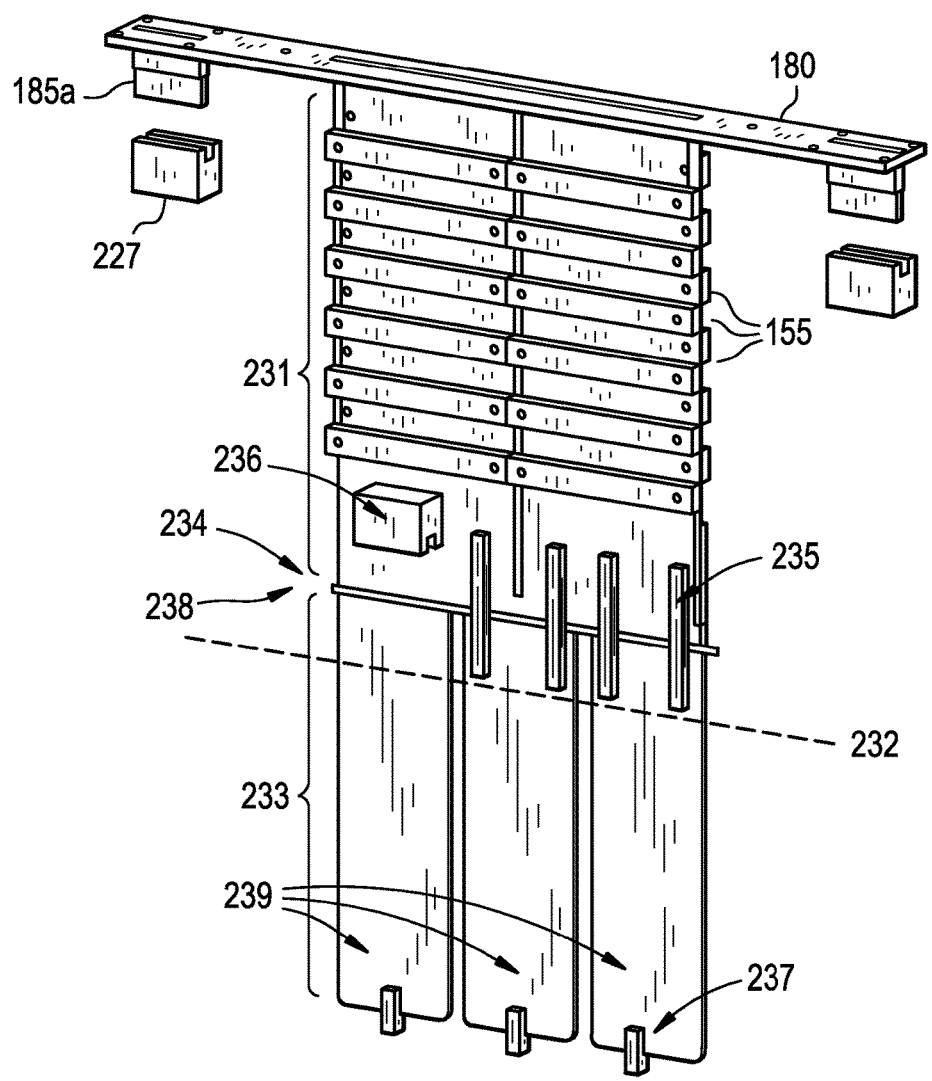
Figure 2B:
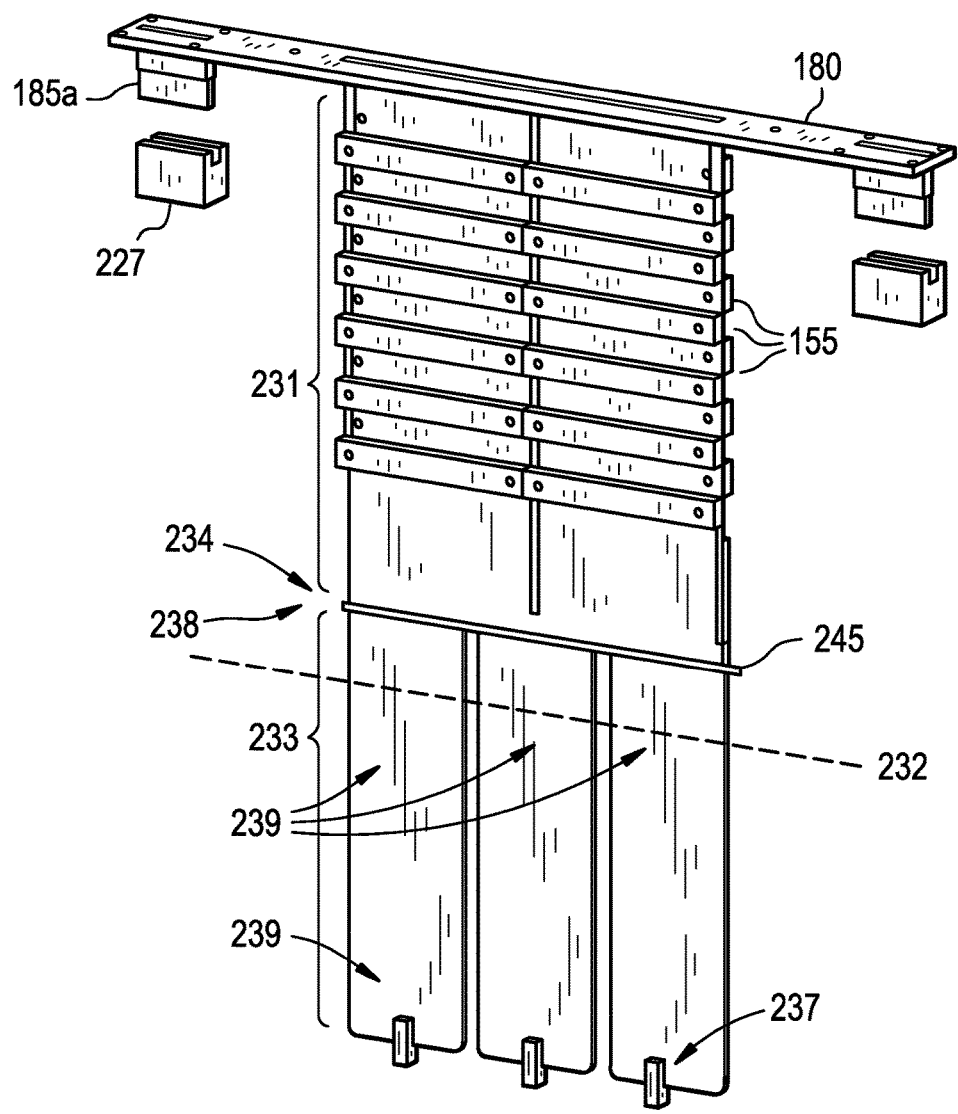

FIGS. 2A to 2C illustrate cathode plates according to some example embodiments. For the sake of brevity, features of the cathode plates in 2A to 2C that are the same as or substantially the same as corresponding features in the conventional cathode plate 150 in FIG. 1B may not be described in detail. However, differences between the cathode plates in FIGS. 2A to 2C and the conventional cathode plate 150 are described in more detail.

Referring to FIG. 2A, in an example embodiment, a cathode plate may be split into an upper blade 231 and a lower blade portion 233 that is connected to the upper blade 231. Reference character 234 corresponds to the split. The upper blade 231 may include an electrically conductive material such as stainless steel or another nonreactive metallic alloy or material, including tungsten, molybdenum, tantalum, etc. Thus, a material of the upper blade 231 may be the same as a material of the conventional cathode plate 150 described in FIG. 1B, but example embodiments are not limited thereto.

The lower blade portion 233 may include an electrically conductive material that is different than the material of the upper blade 231. In some applications, the lower blade portion 233 may be made of or include uranium, zirconium, a blended alloy that includes uranium and/or zirconium (e.g., U—Zr, U—Pu—Zr, etc.), or a combination thereof. However the lower blade portion 233 is not limited these materials.

The lower blade portion 233 may include or consist of a material that may be incorporated into a product formed using metal that has been electrolytically deposited on the lower blade portion 233. In this regard, the cathode plates in FIGS. 2A to 2C differ from the conventional cathode plate 150 in FIG. 1B. For the conventional cathode plate 150 in FIG. 1B, the metal deposited on the cathode plate 150 is physically removed and subsequently processed in order to remove impurities originating from the portion of the cathode plate 150 where the metal is physically removed. In contrast, the metal deposited on the lower blade portion 233 does not have to be physically removed from the lower blade portion 233 because the cathode plate in FIGS. 2A to 2C may include or consist of a material that can be incorporated into a final product formed using the metal that is electrolytically deposited on the cathode plate. As a result, subsequent processing to remove impurities corresponding to lower blade portion 233 may be limited and/or avoided because the material of the lower blade portion 233 would not be considered an impurity in the final product.

For example, in an application where uranium and/or plutonium are extracted from uranium oxide and/or plutonium oxide and electrolytically-deposited on the conventional cathode plate 150 (see FIG. 1B), the subsequent processing after conventional electrochemical processes may include physically removing the converted metal from the cathode plate 150 (see FIG. 1B), performing an electrorefining process to remove impurities from the converted metal, processing the converted metal in a salt press or melt refiner to remove the electrolyte, adding more uranium and/or zirconium to get the final alloy composition, and placing the converted metal with the added uranium and/or zirconium in an induction furnace for casting into a nuclear fuel structure such as fuel slugs.

In contrast, for a cathode plate according to example embodiments, when uranium and/or plutonium are electrolytically-deposited on the lower blade portion 233, the lower blade portion 233 may be made of or include uranium, zirconium, a blended alloy that includes uranium and/or zirconium, or a combination thereof. Therefore, a material of the lower blade portion 233 may be selected so the material is not an impurity in a final product formed using the converted metal. As a result, the lower blade portion 233 including the converted metal (e.g., uranium and/or plutonium) formed thereon may be detached from the cathode plate instead of physically scraping the converted metal off of the cathode plate. Afterwards, because the material (e.g., uranium, zirconium, a blended alloy thereof, and/or a combination thereof) of the lower blade portion 233 may be formed of or include materials that are not an impurity in a nuclear fuel structure, processes for removing impurities from the lower blade portion 233 including the converted metal formed thereon may be reduced and/or avoided. The lower blade portion 233 including the converted metal formed thereon may be broken into smaller pieces and placed in a salt press or melt refiner to remove the electrolyte. After the electrolyte is removed, some material (e.g., uranium and/or zirconium) still be may added to the blend of the deposited metal and lower blade portion 233 in order to obtain a final alloy target composition, but less added material may be needed compared to the amount of material that would have been added if the conventional electrochemical process involving the cathode plate 150 had been performed. Finally, the final alloy target composition based on the blend of the deposited metal, material of the lower blade portion 233, and added material, may be processed in an induction furnace for casting into fuel slugs.

By using a cathode plate that includes a lower blade portion 233 fabricated from a material used in subsequent processing (e.g., uranium, zirconium, or a blended alloy used in metal fuel), the physical removal of the deposited metal on the cathode blade may be eliminated. Instead, lower blade portion 233 may simply be detached from the cathode plate and the blade with the converted metal deposited thereon may be incorporated directly into the process feed stream for the final product (e.g., a fuel slug). Accordingly, the throughput of cathode processing may be improved and the amount of impurities (e.g., stainless steel) in a waste stream may be reduced or eliminated. An electrorefining process for removing impurities may be omitted.

In an example embodiment, after depositing metal one lower blade portion 233 and detaching the lower blade portion 233 with the deposited metal thereon, a new lower blade portion 233 can be connected to the upper blade portion 231 in order to start a new process. Then, the cathode plate including the upper blade portion 231 connected to a new lower blade portion 233 can be loaded into a cathode basket assembly (see FIG. 4) with another batch of oxide for depositing metal on the new lower blade portion 233.

Although not illustrated, the lower portion 233 of the cathode plates in FIGS. 2A to 2C may include stiffening hems or ribs that are the same as or similar to the stiffening hems or ribs 151 shown in the cathode 150 in FIG. 1B. The lower blade portion 233 may be in direct contact with the upper blade 231. Alternatively, the lower blade portion 233 may be spaced apart from the upper blade 231 in a vertical direction. For example, as shown in FIG. 2B, the lower blade portion 233 may directly contact the upper blade 231 so that there is an interface 245 between the lower blade portion 233 and the upper blade 231. The lower blade portion 233 may contact the upper blade 231, but also be configured so the lower blade portion 233 can be mechanically detached from the upper blade 231 without cutting the lower blade portion 233.

The lower blade portion 233 may be connected to the upper blade 231 using at least one connection structure that is configured to secure the lower blade portion 233 to the upper blade 231 while providing electrical continuity between the lower blade portion 233 and the upper blade 231. The connection structure may be configured to be disconnected from the lower blade portion 233 to detach the lower blade portion 233 from the upper blade 231. The type of connection structure utilized is not particularly limiting as long as the connection structure is capable of providing electrical continuity between the lower blade portion 233 and the upper blade 231 while the lower blade portion 233 is connected to the upper blade 231.

When one of the cathode plates of FIGS. 2A to 2C is positioned in a cathode basket assembly (see FIG. 4), the connection structure should ensure that the cathode plate is electrically insulated from the cathode basket assembly. As shown in FIG. 2A, the connection structure may be a fastener in the form of a multi-layer structure 235 such as a clamp that includes an electrically insulating portion (e.g., a ceramic layer) and an underlying electrically conductive portion (e.g., a metal layer such as stainless steel). The electrically conductive portion of the multi-layer structure 235 may contact both front and back sides of the upper blade 231 and the lower blade portion 233, respectively, in order to provide electrical continuity between the upper blade 231 and the lower blade portion 233. Also, the electrically insulating portion (e.g., a ceramic layer) may insulate the multi-layer structure 235 from the cathode basket assembly when the cathode plate is in the cathode basket assembly. In other words, an outer portion of the multi-layer structure 235 may be the electrically insulating portion and may be used as a centering guide to electrically insulate the cathode plate from cathode basket assembly when the cathode plate is in the cathode basket assembly, similar to the ceramic spacers 155 on the upper blade 231.

The multi-layer structure 235 may be mounted so one end connects to a portion of the lower blade portion 233 that is above the salt level 232 and another end connects to a bottom portion of the upper blade 231. The salt level 232 corresponds to a level where the electrolyte contacts the lower blade portion 233 when the cathode plate of FIG. 2A is placed in a cathode basket assembly, as described later with reference to FIG. 2D.

Instead of the multi-layer structure 235, the connection structure may alternatively connect the upper blade 231 to the lower blade portion 233 using a different means such as a hook, a nut and bolt connection, a knife contact, etc. FIG. 2A illustrates a connection structure in the form of a connector 236 for forming a knife contact between the lower blade portion 233 and the upper blade 231. The knife contact 236 between the lower blade portion 233 and the upper blade 231 is described later with reference to FIG. 2D. Although not illustrated in FIG. 2A, when the connection structure includes a hook, one end of the hook may be secured to the upper blade 231 or lower blade portion 233 and the other end (i.e., the hook part) may be inserted into a hole defined in the other one of the upper blade 231 or lower blade portion 233.

FIG. 2C illustrates a cathode plate that is similar to the cathode plate shown in FIG. 2A, except the connection structure is in the form of a nut and bolt connection 250 between the upper blade 231 and the lower blade portion 233. An outer surface of the nut and/or bolt used in the nut and bolt connection 250 may include an electrically insulating material (e.g., ceramic) so the nut and/or bolt ensures that the cathode plate is electrically insulated from the cathode basket assembly when the cathode plate is in the cathode basket assembly. In addition, the nut and bolt may be sized so the nut and bolt are spaced apart from the cathode basket assembly when the cathode plate is in the cathode basket assembly.

The lower blade portion 233 may include a plurality of lower blades 239 that are spaced apart from each other in a horizontal direction. The connection structure may include a plurality of connection structure portions that are each configured to secure a corresponding one of the plurality of lower blades 239 to the upper blade 231. Each of the plurality of connection structure portions may be one a multi-layer structure including a ceramic outer portion and an electrically conductive portion contacting the upper blade and the corresponding one of the plurality of lower blades, a nut and a bolt, and a knife contact. For example, as shown in FIG. 2A, a plurality of multilayer structures 235 or a knife contact 236 may secure the plurality of lower blades 239 to the upper blade 231. Alternatively, as shown in FIGS. 2B and 2C, each one of the plurality of lower blades 239 may be directly connected to the upper blade 231 and an interface 245 (see FIG. 2B) or connected to the upper blade 231 using at least one nut and bolt connection 250.

Figure 2D:
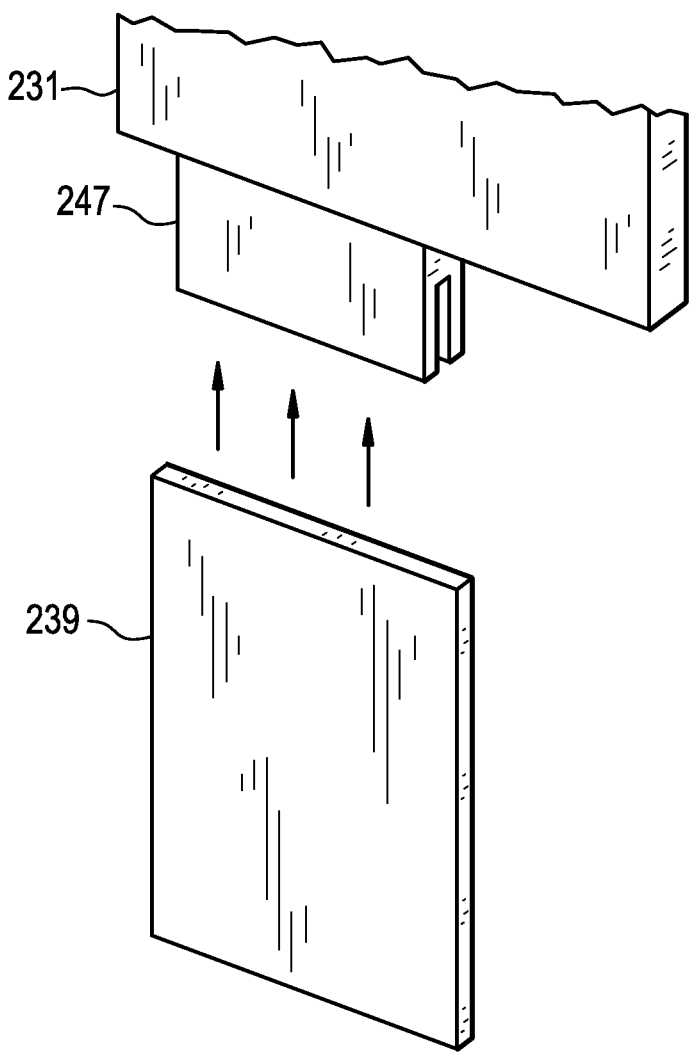
FIG. 2D illustrates an example of a knife contact in a cathode plate according to example embodiments.

FIG. 2D illustrates an example of a knife contact in a cathode plate according to example embodiments. The knife contact 236 in FIG. 2A between the upper blade 231 and the lower blade 233 may be implemented as shown in FIG. 2D. The knife contact 236 may include a contactor 247 connected to a bottom portion of the upper blade 231. The contactor 247 may define a groove so one of the plurality of lower blades 239 of the lower blade portion 231 can be inserted into the groove to contact the contactor 247 and secured in place (e.g., clamped or bolted). The contactor 247 may be formed of an electrically conductive material that is the same as the upper blade 231. When one of the plurality of lower blades 239 is inserted into the contactor 247, the contactor 247 may secure the lower blade 239 to the upper blade 231 and provide electrical continuity between the lower blade 239 and upper blade 231.

A base portion of each one of the plurality of lower blades 239 may be connected to one or more ceramic spacers 237. The ceramic spacers 237 may electrically insulate the plurality of lower blades 239 from the basket 110 when the cathode plate is placed in the cathode basket assembly. Alternatively, the ceramic spacers 237 may be a part of the basket. For example, the ceramic spacers 237 may be positioned at a bottom of the basket compartments 107 shown in FIG. 1B. When the ceramic spacers 237 are a part of the basket, the cathode plates of FIGS. 2A to 2C can be positioned on top of the ceramic spacers 237 when the cathode plates are positioned in the cathode basket assembly.

Although FIGS. 2A to 2C each illustrate examples of cathode plates where the lower blade portion 233 includes 3 lower blades 239, example embodiments are not limited thereto and number of lower blade 239 in the lower blade portion 233 may vary. The size of each one of the lower blades 239 may be determined so the lower blade 239 may be positioned in a corresponding one of the basket compartments 207 defined by the dividers 206 in the cathode basket assembly shown in FIG. 4.

For example, referring to FIGS. 2A to 2C and 4, each blade 239 may have a thickness in a range from greater to 0 inches to about ⅛ inches, a width W1 in a range that is about 6 inches or in a range from about 4 inches to about 8 inches, and a height H1 that is about 22 inches or in a range from about 20 inches to about 25 inches. However, the dimensions of the blades may be varied as desired. The height H2 of the blade 239 that corresponds to the salt level when the cathode plate is placed in a cathode basket assembly may be about 19 inches or in a range from about 17 inches to about 22 inches. However, the height H2 may depend on the amount oxide that is loaded into the basket of the cathode basket assembly and the amount of electrolyte permeating into the basket.

Figure 3:
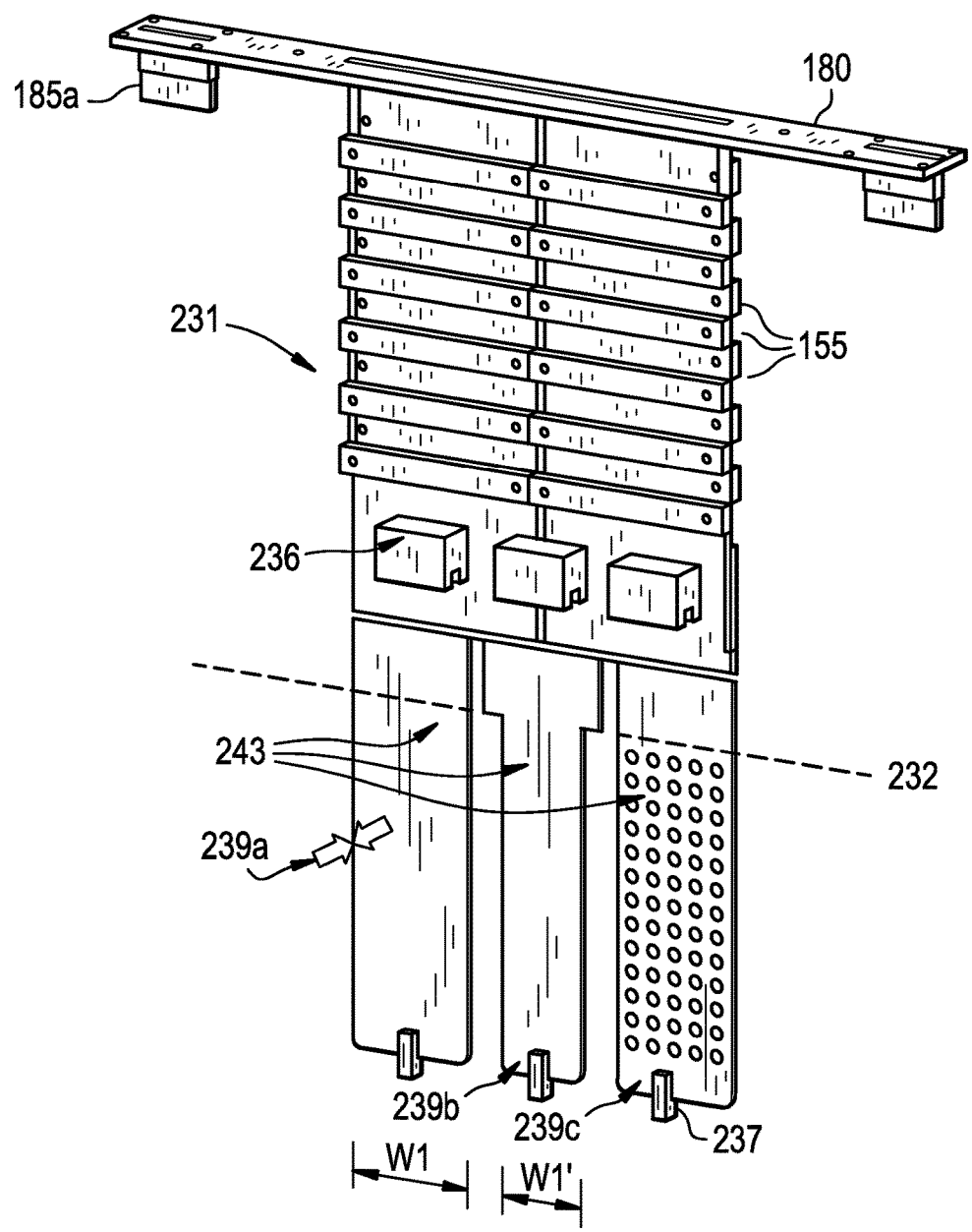
FIG. 3 illustrates examples of lower blades of a cathode plate according to example embodiments.

FIG. 3 illustrates examples of lower blades of a cathode plate according to example embodiments.

Referring to FIG. 3, various modifications of the shape and structure of the lower blade portion 233 in FIGS. 2A to 2C may be employed. The lower blade portion 243 in FIG. 3 illustrates some of the modifications that may be made to the lower blades 239 in the lower blade portion 233 in FIGS. 2A to 2C.

For example, as shown by the left blade 239a in FIG. 3, one or more of the blades 239 of the cathode plate may have a reduced thickness compared to the blades 239 in FIGS. 2A to 2C. A thickness of the blade 239a may be greater than 0 inches and less than a thickness of the upper blade 231. Reducing the thickness of blade 239a reduces the amount that the blade 239a contributes to the final blending requirements, based on the material of the blade 239a and converted metal that is electrolytically deposited on the blade 239a.

As shown by the middle blade 239b in FIG. 3, one or more of the blades 239 of the cathode plate may include two portions having different widths relative to each other. For example, as shown by the middle blade 239, one or more have of the blades 239, may include a portion that has a reduced width W1' compared to a width W1 of the blades 239 in FIGS. 2A to 2C and 4 and/or blades 239a and 239c in FIG. 3. In FIG. 3, W1' may be greater than 0 inches and less than about 6.3 inches. Reducing the width of blade 239b at a portion reduces the amount that the blade 239b contributes to the final blending requirements, based on the material of the blade 239b and converted metal that is electrolytically deposited on the blade 239b.

As shown by the right blade 239c in FIG. 3, one or more of the blades 239 of the cathode plate may define at least one opening. For example, one or more of the blades 239 may define a hole or a plurality of holes that are spaced part from each other. Instead of a hole or a plurality holes, at least one slit may be formed in the blade 239c. Forming at least one hole or slit in the blade 239c reduces the amount that the blade 239c contributes to the final blending requirements, based on the material of the blade 239c and converted metal that is electrolytically deposited on the blade 239c.

Another alternative is forming one or more of the lower blades 239 from a blended alloy (e.g., a U—Zr alloy). By forming one or more of the lower blades 239 using an alloy of a first element and a second element, the ratio of the first element and/or second element to a total weight of the lower blade and converted metal deposited thereon would be less than would occur if the lower blade had only been made of the first element or second element.

As described above, cathode plates according to some example embodiments may be used in a method of making a fuel structure. The method may include reducing a metal oxide (e.g., spent nuclear fuel, plutonium oxide, and/or uranium oxide) in a cathode assembly so as to deposit a metal of the metal oxide on a cathode plate of the cathode assembly, and processing the cathode plate with the metal deposited thereon to fabricate the nuclear fuel structure. Reducing the metal oxide may include immersing the cathode assembly with the metal oxide in an electrolyte and energizing the cathode assembly to deposit the metal from the metal oxide onto the cathode plate. After depositing the metal on the cathode plate, the cathode plate with the metal deposited thereon may be removed from the cathode assembly and processed into a nuclear fuel structure such as a nuclear fuel rod. The term "processed into a nuclear fuel structure" may include, for instance, incorporating at least 10% by weight of one of the blades 239 in FIG. 2A to 2C (or a variation based on the blades 239a to 239c in FIG. 3) into the nuclear fuel structure.

According to an example embodiment, a method of manufacturing a cathode plate may include securing an upper blade 231 to a lower blade portion 233 with a connection structure (e.g., knife contact 236, nut-and-bolt connection 250, multi-layer structure 235, etc.). The upper blade may include an electrically conductive material. The connection structure may be configured to provide electrical continuity between the lower blade portion and the upper blade when the connection structure secures the lower blade portion to the upper blade. The connection structure may be configured to be disconnected from the lower blade portion 233 to detach the lower blade portion 233 from the upper blade 231. The lower blade portion 233 may be a plurality of lower blades 239 spaced apart from each other, and the connection structure may include a plurality of connection structure portions. The securing the upper blade 231 to the lower blade portion 233 may include securing the upper blade 231 to the plurality of lower blades 239 using the plurality of connection structure portions. Each of the connection structure portions may be a knife contact 236 or a multi-layer structure 235 in the form of a ceramic spacer with underlying metal.

In an example embodiment, a cathode basket assembly may be manufactured by joining a lower basket assembly to an upper basket assembly to form a joined assembly, and suspending the cathode plate in the joined assembly. The upper basket assembly may surround the upper blade. The lower blade portion may be partially enclosed by the lower basket assembly, and the upper blade and the lower blade portion may be electrically insulated from the upper basket assembly and the lower basket assembly, respectively. The lower basket assembly may be configured to detach from the upper basket assembly to remove the cathode plate from the joined assembly.

FIG. 4 illustrates a cathode basket assembly according to an example embodiment.

Referring to FIG. 4, when the cathode plates of FIG. 2A to 2C or cathode plate variation based on FIG. 3 are positioned in a cathode basket assembly, the positioning arrangement for the cathode plates of FIG. 2A to 2C or a variation based on FIG. 3 may be the same as or similar to the cathode plate 150 in the cathode basket assembly as shown in FIG. 1A. In other words, except for when the cathode basket assembly includes a cathode plate according to examples (e.g., one of cathode plates in FIG. 2A to 2C or a modification based on FIG. 3) instead of the conventional cathode plate 150, the cathode basket assembly in FIG. 4 may be the same as or similar to the cathode basket assembly discussed in FIG. 1A of the present application.

The cathode basket assembly in FIG. 4 may include a lower portion (also referred to as lower basket assembly, refer to the lower portion 112 in FIG. 1A) joined to an upper portion 111 (also referred to as upper basket assembly). One of the above-discussed cathode plates described above with reference to FIG. 2A to 2C or a variation based on FIG. 3 may be inserted into the cathode basket assembly shown in FIG. 4. The upper portion 111 may surround the cathode plate. Ceramic spacers 155 (see FIG. 2A) may electrically insulate the upper blade 231 of the cathode plate from the upper portion 111. The lower blade portion 233 of the cathode plate may be enclosed by the lower portion without directly contacting the lower portion. The lower portion of the cathode basket assembly includes a lower basket section with a height H3 and a basket frame height H4. The lower portion of the cathode basket assembly may detach from the upper portion 111 in order to remove the cathode plate from the cathode basket assembly.

The lower basket assembly may include a plurality of dividers 206 that define basket compartments 207. The basket compartments 207 defined by the dividers 206 may be the same as or substantially the same as the basket compartments 107 defined by the dividers 106 discussed before with reference to FIG. 1A. The lower blades 239 of the cathode plate may be spaced part from each other and sized so the lower blades 239 may fit in corresponding basket compartments 207 without electrically contacting the lower basket assembly.

At least one bottom ceramic structure may be between a base of the lower blade portion 233 and a bottom of the lower basket assembly. The at least one bottom ceramic structure may be configured to maintain a physical separated between the lower blade portion 233 and the lower basket assembly. For example, the ceramic spacers 237 described above with reference to FIG. 2A may be secured to a bottom of the lower blade portion 233 or part of the basket instead of secured to the lower blades 239. For example, the ceramic spacers 237 may be in the basket compartments 207 to insulate the lower blades 239 from the basket of the cathode basket assembly in FIG. 4. The height H3 of the basket lower section may be less than a height H4 of the basket frame H4. The difference between the heights H3 and H4 allows the cathode basket assembly to define an opening between the upper and lower portions of the cathode basket assembly so oxide can be loaded in the basket compartments 207. A length L of the basket lower section is sufficiently greater than a thickness of the lower blade portion 233 or 243 in order to allow a clearance for when the lower blade portion 233 or 243 is in the basket lower section and accommodate oxide added into the lower basket section.

The salt level 232 may be just below the opening between the upper basket assembly 112 and lower basket assembly 111 (refer to FIG. 1A) such that salt level is adjacent a top of the lower blade portion 233. The connectors 185a and 185b on the cathode plates in FIGS. 2A to 2C may be inserted into a knife contact 227 that is the same as or substantially the same as the knife contact 127 in FIG. 1A of the present application. Also, the upper blade 231 may include one or more ceramic spacers 155 that spaced apart from each other along at least one of a front surface and a back surface of the upper blade 231. The back surface of the upper blade 231 may be opposite the front surface of the upper blade 231. The ceramic spacers 155 may be used for electrically insulating the upper blade 231 from the basket 110 when the cathode plate is placed in the cathode basket assembly. If the cathode plate is not electrically insulated from the cathode basket assembly when inserted in the cathode basket assembly, then the intended function of the cathode basket assembly is inhibited.

The cathode basket assembly may be configured to deposit a metal onto the lower blade portion 233. Metal oxide may be added into the lower portion of the cathode basket assembly to contact the blades 239 of the lower blade portion 233. Electrolyte may permeate into the lower portion of the cathode basket assembly into the basket compartments 206 so the electrolyte reaches up to the salt line 232. The liquid electrolyte may be a halide salt or salt containing a soluble oxide that provides mobile oxide ions, chosen based on the type of material to be reduced. For example, $CaCl_2$ and CaO, or $CaF_2$ and CaO, or some other Ca-based electrolyte, or a lithium-based electrolyte mixture such as LiCl and $Li_2O$, may be used in reducing rare-earth oxides, or actinide oxides such as uranium or plutonium oxides, or complex oxides such as spent nuclear fuel. However, example embodiments are not limited thereto and other oxides and/or electrolytes may be used. The cathode basket assembly may be configured to energize a mixture containing the electrolyte and metal oxide as the mixture contact the lower blade portion 233 in order to reduce the metal oxide into metal and deposit the metal on the lower blade portion 233. The metal oxide may include at least one of plutonium oxide and uranium oxide, but is not limited thereto.

As discussed above, in cathode plates according to example embodiments, the lower blade portion 233 may include or consist of a material that may be incorporated into a product formed using metal that has been electrolytically deposited on the lower blade portion 233. When metal is electrolytically deposited on the lower blade portion 233 and the blades 239 including metal thereon are detached, the blades 239 including metal thereon may be evaluated to determine if the composition of the blades 239 including metal thereon is consistent with a desired final alloy composition. Hereinafter, non-limiting examples are described.

Example 1—Processing with Pure Blade

Table 1 summarizes blade volume and mass calculations for different materials used for the lower blade. The lower blades 239, 239a, 239b, and 239c in FIGS. 2A to 2C, 3 and 4 are not limited to the blade dimensions in Table 1. For comparison data, a comparative example based stainless steel is also provided.

TABLE 1

Blade volume and Material Mass Calculations

| | Blade Volume (cc) | Stainless Steel Mass (Density = 8 g/cc) | Uranium Mass (Density = 19.1 g/cc) | Zirconium Mass (Density = 6.52 g/cc) |
|---|---|---|---|---|
| Blade to Apex 0.125 inches × 6.3 inches × 21.69 | 280.46 | 2.24 kg | 5.35 kg | 1.83 kg |
| Submerged Blade (below the salt line) 0.125 inches × 6.3 inches × 18.5 inches | 239.21 | 1.91 kg | 4.57 kg | 1.56 kg |

The blade volume was estimated by a thickness×width× depth, with depths chosen being either the apex height (where the apex of the cut between blades) or the salt height. The approximate mass was calculated from the density of the stainless steel, uranium, or zirconium (the U—Zr alloy was not selected for the initial evaluation).

Only a single blade, representing the mass of a single blade in a single basket compartment is presented in Table 1. To obtain an overall mass for all three blades in a Basket Assembly, the values in Table 1 would be multiplied by the number of blades used; assuming the blade mass would be equivalent.

A single standard can of $PuO_2$ may have a maximum mass of 7 kg oxide, which can be reduced using an electrochemical process to metal with a mass of 6.2 kg plutonium. The mass of uranium and zirconium added to achieve two example plutonium fuel contents are shown below in Table 2.

TABLE 2

Mass of Fuel composition for both High Content and Low Content Fuel

|  | Low Pu Content [LE] | High Pu Content [HE] |
|---|---|---|
| Std $PuO_2$ can kg (%)Pu | 6.2 (16.15%) | 6.2 (21.79%) |
| Std $PuO_2$ can kg (%) U | 28.2 (73.85%) | 19.3 (68.21%) |
| Std $PuO_2$ can kg (%) Zr | 3.8 (10.00%) | 2.8 (10.00%) |
| Std $PuO_2$ can kg (%) Total | 38.2 (100.00%) | 28.3 (100.00%) |

Referring to Table 2, for a Low Pu Content fuel composition that includes 6.2 kg of plutonium (Pu), the Low Pu Content fuel composition would need 28.2 kg of uranium (U) and 3.8 kg of zirconium (Zr) in order to have a composition ratio of 16.15% Pu, 73.85% U, and 10% Zr. For a Hi Pu Content fuel composition that includes 6.2 kg of plutonium (Pu), the High Pu Content fuel composition would need 19.3 kg of uranium (U) and 2.8 kg of zirconium (Zr) in order to have a composition ratio of 21.79% Pu, 68.21% U, and 10% Zr. The 6.2 kg of plutonium is based on the amount of metal that may be reduced from a 7 kg single standard can of $PuO_2$.

For a 7 kg of $PuO_2$ charges, the uranium or zirconium blades would make up a percentage of the final amount in the fuel. The percentage is shown in Table 3 according to respective high or low contents. The values in Table 3 are generated by Table 1 mass at salt level/Table 2 mass for the respective enrichment.

TABLE 3

% of Uranium or Zirconium Contributed by the blade to the final fuel mass.

|  | One blade/One compartment | Two blades/two compartments | Three blades/three compartment |
|---|---|---|---|
| % U of blade [LE] | 16.2% | 32.4% | 48.6% |
| % U of blade [HE] | 23.7% | 47.3% | 71.0% |
| % Zr of blade [LE] | 41.0% | 82.1% | 123.1% |
| % Zr of blade [HE] | 55.7% | 111.4% | 167.1% |

Referring to Table 3, if a blade (see blade 239 in FIG. 2A) is made entirely of uranium (U), then based on Table 1, the blade may be about 5.35 kg of uranium (U) and the submerged portion may be 4.57 kg of uranium. As shown in Table 2, a Low Pu Content [LE] fuel may have 28.2 kg of uranium (U) and a High Pu Content [HE] fuel may have 19.3 kg of uranium (U). Thus, the 4.57 kg of uranium (U) in a submerged portion of a blade may contribute 16.2% (4.57/28.2) to the composition of a Low Pu Content [LE] fuel and 23.7% (4.57/19.3) to a High Pu Content fuel [HE]. If 2 or 3 blades are used, then the percentages are double and tripled in Table 3.

For a zirconium (Zr) blade, the blade may be 1.83 kg and the submerged portion may be 1.56 kg. As shown in Table 2, a Low Pu Content [LE] fuel may have 3.8 kg of zirconium and a High Pu Content [HE] fuel may have 2.8 kg of zirconium (Zr). Thus, the 1.56 kg of zirconium (Zr) in a submerged portion of a blade may contribute 41.0% (1.56/3.8) to the composition of a Low Pu Content [LE] fuel and 55.7% (1.56/2.8) to a High Pu Content fuel [HE]. If 2 or 3 blades are used, then the percentages are double and tripled in Table 3.

Referring to Table 3, if the blades were made of uranium, in a single-U-blade/one-basket-compartment-configuration, a uranium blade would contribute less than 23% of the uranium in the final fuel mixture. In two-U-blade/two-compartment arrangements, the uranium blades would contribute less than 47.3% of the uranium, and in a three-U-blade/three-compartment arrangement, the uranium added by the blades would be less than 71%. If the blades were made of zirconium, with a single-Zr-blade/one-basket compartment, the zirconium blade would contribute less than 55.7% of the zirconium in the final fuel alloy. In a two-Zr-blade/two-compartment arrangement, the zirconium blades would contribute less than 82.1% of the zirconium in a low content fuel alloy, but would contribute more zirconium than would be used in the final fuel alloy for high content fuel, and in a three-Zr-blade/three-compartment arrangement, the zirconium added by the blades exceeds the mass needed in both high and low content alloys.

In summary, Table 2 indicates that a two- or three-blade/compartment arrangement may be satisfactory for processing if the blades are made of uranium, but not satisfactory if the blades are made of zirconium, for anything but two blade/compartment processing of LE fuel. Additional modifications may be used for processing with zirconium blades.

The data in Tables 1-3 is for an example where each basket compartment 206 may have a capacity of about 8 kg each, but the capacity of the basket compartments 206 in FIG. 4 may be greater or less than 8 kg each.

Example 2

For uranium processing, a 50/50 ratio of the incoming blend U—Pu oxide will also bring in an equal portion of uranium metal. The U blade/blend uranium combinations of the final alloy are shown in Table 4:

TABLE 4

% of Uranium Contributed by the blade and by the blend to the final fuel mass.

|  | One blade/One compartment | Two blades/two compartments | Three blades/three compartment |
|---|---|---|---|
| % U of blade [LE] | 38.2% | 54.4% | 70.6% |
| % U of blade [HE] | 55.8% | 79.5% | 103.1% |

The values in Table 4 are generated by dividing the combined uranium mass (blade+blend) by the Table 2 uranium mass for the respective enrichment. The combined uranium mass is the blade (Table 1 mass) with the 50/50 blend mass (or 6.2 kg).

In a single U-blade/one-compartment, a uranium blade would contribute less than 55.8% of the uranium in the final fuel mixture, and in a two-U-blade/two-compartment arrangements, the uranium blades would contribute less than 79.5% of the uranium. In the three-U-blade/three-compartment arrangements, the uranium added by the blades would be provide 70.6% of the uranium needed in the final fuel allow for low content fuel, but more than is needed for high content fuel.

If the incoming feed blend has higher uranium content (66/33, 70/30 or 75/25), additional basket compartments and baskets may be utilized. Additional uranium may be added with the blend.

Deploying a cathode plate that includes a lower blade portion made from a material (e.g., uranium, zirconium, a blended alloy including uranium and zirconium, etc.) may eliminate the physical removal (e.g., scraping, chiseling, grinding) of U—Pu from a metal cathode in conventional electrochemical processes and subsequent impurity removal processes (e.g., electrorefining) or other difficult removal methods. Electroplating is typically performed to put a thin layer of material onto a receiving metal for corrosion protection or other functions. Removal of electroplated material is not typically preformed. With the blade split into an upper and lower blade, the lower blade of the blade made from uranium, zirconium or alloy may be mechanically (clamped, screwed or bolted) to the upper blade. The mechanical attachment allows removal of the blade with the deposited alloy a mechanical (unclamping or unbolting) means instead of a physical removal (scraping, etc.). This simplifies the removal steps in processing a cathode used in a electrochemical process for reducing metal.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. A cathode plate, comprising:
   an upper blade of the cathode plate, the upper blade including an electrically conductive material;
   a lower blade portion of the cathode plate, the lower blade portion connected to the upper blade; and
   a connection structure configured to secure the lower blade portion to the upper blade while providing electrical continuity, the connection structure configured to be disconnected from the lower blade portion to detach the lower blade portion from the upper blade, the connection structure being electrically conductive and including an electrically conductive material, wherein the lower blade portion includes uranium, zirconium, or a combination thereof.

2. The cathode plate of claim 1, wherein
   a material of the lower blade portion is different than the electrically conductive material of the upper blade.

3. The cathode plate of claim 1, wherein
   the lower blade portion is in a form of a plurality of lower blades spaced apart from each other,
   the connection structure includes a plurality of connection structure portions,
   the plurality of connection structure portions are each configured to secure a corresponding one of the plurality of lower blades to the upper blade.

4. The cathode plate of claim 3, wherein each of the plurality of connection structure portions is one of a multi-layer structure including a ceramic outer portion and an electrically conductive portion contacting the upper blade and the corresponding one of the plurality of lower blades, a nut and a bolt, and a knife contact.

5. The cathode plate of claim 3, wherein one or more of the plurality of lower blades include at least one of:
   a thickness that is greater than 0 inches and less than a thickness of the upper blade,
   two portions having different widths relative to each other, and
   at least one opening defined by the one or more of the plurality of lower blades.

6. The cathode plate of claim 1, further comprising:
   one or more ceramic spacers spaced apart from each other along at least one of a front surface and a back surface of the upper blade, wherein
   the back surface is opposite the front surface.

7. The cathode plate of claim 1, wherein
   the upper blade is elongated between a bottom surface and an upper surface of the upper blade,
   the bottom surface of the upper blade is on top of a top surface of the lower blade portion, and
   the bottom surface of the upper blade faces the top surface of the lower blade portion.

8. A cathode basket assembly, comprising:
   an upper basket assembly;
   a lower basket assembly joined to the upper basket assembly; and
   the cathode plate of claim 6 suspended in the cathode basket assembly, wherein
   the upper basket assembly surrounds the upper blade,
   the one or more ceramic spacers electrically insulate the upper blade from the upper basket assembly,
   the lower blade portion is partially enclosed by the lower basket assembly without directly contacting the lower basket assembly, and
   the lower basket assembly is configured to detach from the upper basket assembly to remove the cathode plate from the cathode basket assembly.

9. The cathode basket assembly of claim 8, wherein
   the lower blade portion of the cathode plate is in a form of a plurality of lower blades spaced apart from each other,
   the lower basket assembly includes dividers that define basket compartments, and
   the plurality of lower blades are in corresponding ones of the basket compartments without directly contacting the lower basket assembly.

10. The cathode basket assembly of claim 8, further comprising:
    at least one bottom ceramic structure between a base of the lower blade portion and a bottom of the lower basket assembly, wherein
    the at least one bottom ceramic structure is configured to maintain a physical separation between the lower blade portion and the lower basket assembly.

11. The cathode basket assembly of claim 8, wherein
    the cathode basket assembly is configured to deposit a metal onto the lower blade portion if,
    a mixture containing an electrolyte and a metal oxide is in the lower basket assembly and contacting the lower blade portion,
    the cathode basket assembly energizes the mixture in order to reduce the metal oxide into the metal and deposit the metal on the lower blade portion, and
    the metal oxide includes at least one of plutonium oxide and uranium oxide.

12. A method of manufacturing a cathode plate, comprising:
    securing an upper blade to a lower blade portion with a connection structure,
    the upper blade including an electrically conductive material,
    the connection structure configured to provide electrical continuity between the lower blade portion and the upper blade when the connection structure secures the lower blade portion to the upper blade, the lower blade portion including uranium, zirconium, or a combination thereof, and the connection structure is configured to be disconnected from the lower blade portion to detach the lower blade portion from the upper blade.

13. The method of claim 12, wherein a material of the lower blade portion is different than an electrically conductive material of the upper blade.

14. The method of claim 12, wherein the lower blade portion is a plurality of lower blades spaced apart from each other, the connection structure includes a plurality of connection structure portions, the securing the upper blade to the lower blade portion includes securing the upper blade to the plurality of lower blades using the plurality of connection structure portions, and each of the plurality of connection structure portions is one of a ceramic spacer with underlying metal and a knife contact.

15. A method of manufacturing a cathode basket assembly, comprising:

manufacturing a cathode plate using the method of claim 12;

joining a lower basket assembly to an upper basket assembly to form a joined assembly;

suspending the cathode plate in the joined assembly, wherein the upper basket assembly surrounds the upper blade, the lower blade portion is partially enclosed by the lower basket assembly, and the upper blade and the lower blade portion are electrically insulated from the upper basket assembly and the lower basket assembly, respectively, the lower basket assembly is configured to detach from the upper basket assembly to remove the cathode plate from the joined assembly.

16. A method of making a nuclear fuel structure, comprising:

manufacturing a cathode plate using the method of claim 12;

reducing a metal oxide in a cathode assembly including the cathode plate so as to deposit a metal of the metal oxide on the cathode plate of the cathode assembly; and processing the cathode plate with the metal deposited thereon to fabricate the nuclear fuel structure.

17. The method of claim 16, wherein the reducing includes at least one of:

immersing the cathode assembly with the metal oxide in an electrolyte; and energizing the cathode assembly.

18. The method of claim 16, wherein the metal oxide includes at least one of:

spent nuclear fuel;

plutonium oxide; and uranium oxide.

19. The method of claim 16, wherein the processing includes removing the cathode plate with the metal deposited thereon from the cathode assembly; and the nuclear fuel structure is a fuel rod.

20. The method of claim 19, wherein the removing includes detaching the lower blade portion from the upper plate.

* * * * *